(12) United States Patent
Armitage

(10) Patent No.: US 9,842,287 B2
(45) Date of Patent: Dec. 12, 2017

(54) CARGO MONITORING

(71) Applicant: Cartasite, LLC, Denver, CO (US)

(72) Inventor: David L. Armitage, Golden, CO (US)

(73) Assignee: Cartasite, LLC, Denver, CO (US)

( * ) Notice: Subject to any disclaimer, the term of this patent is extended or adjusted under 35 U.S.C. 154(b) by 0 days.

(21) Appl. No.: 15/242,360

(22) Filed: Aug. 19, 2016

(65) Prior Publication Data

US 2016/0358054 A1 Dec. 8, 2016

Related U.S. Application Data

(63) Continuation-in-part of application No. 14/286,676, filed on May 23, 2014.

(51) Int. Cl.

| | |
|---|---|
| G07C 5/00 | (2006.01) |
| G06K 17/00 | (2006.01) |
| H04L 29/08 | (2006.01) |
| G01F 23/284 | (2006.01) |
| G06K 19/06 | (2006.01) |
| G06K 7/14 | (2006.01) |
| G06Q 10/08 | (2012.01) |
| H04L 29/06 | (2006.01) |

(52) U.S. Cl.
CPC ....... *G06K 17/0022* (2013.01); *G01F 23/284* (2013.01); *G06K 7/1417* (2013.01); *G06K 19/06037* (2013.01); *G06Q 10/087* (2013.01); *H04L 63/0428* (2013.01); *H04L 67/10* (2013.01)

(58) Field of Classification Search
CPC ............ G06K 17/0022; G06K 7/1417; G06K 19/06037; G01F 23/284; G06Q 10/087; H04L 63/0428; H04L 67/10
See application file for complete search history.

(56) References Cited

U.S. PATENT DOCUMENTS

| | | | |
|---|---|---|---|
| 7,757,952 B2* | 7/2010 | Tuschel | G06K 19/06037 235/375 |
| 8,768,565 B2* | 7/2014 | Jefferies | G07B 15/00 701/29.6 |
| 9,566,404 B2* | 2/2017 | Whitman | A61M 16/0051 |
| 2001/0025272 A1* | 9/2001 | Mori | G06F 21/31 705/76 |
| 2006/0149407 A1* | 7/2006 | Markham | B23Q 35/12 700/108 |
| 2010/0241857 A1* | 9/2010 | Okude | B60R 25/24 713/168 |
| 2013/0032634 A1* | 2/2013 | McKirdy | G06Q 30/0271 235/375 |
| 2013/0176141 A1* | 7/2013 | LaFrance | G08C 17/02 340/870.02 |

(Continued)

*Primary Examiner* — Sharon Lynch
(74) *Attorney, Agent, or Firm* — Holzer Patel Drennan

(57) ABSTRACT

Systems, software, and methods are provided for accurate service, transaction, and cargo monitoring. An example system and/or method may include calibrating a wireless sensor, connecting a user device to a wireless sensor, obtaining initial information for a first process at least in part from the wireless sensor, obtaining subsequent information about at least the first process, and using a portion of the initial information about the first process and the subsequent information about the first process to create a dynamic report involving the first process.

13 Claims, 6 Drawing Sheets

(56) References Cited

U.S. PATENT DOCUMENTS

| | | | | |
|---|---|---|---|---|
| 2013/0179692 A1* | 7/2013 | Tolba | ............ | H04L 63/08 |
| | | | | 713/179 |
| 2013/0262873 A1* | 10/2013 | Read | ............ | H04W 12/06 |
| | | | | 713/186 |
| 2013/0264382 A1* | 10/2013 | Taylor | ............ | G06Q 10/087 |
| | | | | 235/375 |
| 2013/0290416 A1* | 10/2013 | Nelson | ............ | G06Q 10/10 |
| | | | | 709/204 |
| 2013/0317693 A1* | 11/2013 | Jefferies | ............ | G07B 15/00 |
| | | | | 701/31.5 |
| 2013/0339745 A1* | 12/2013 | Gramelspacher | ............ | G06F 21/335 |
| | | | | 713/183 |
| 2014/0006151 A1* | 1/2014 | Grigg | ............ | G06Q 20/20 |
| | | | | 705/14.53 |
| 2014/0006186 A1* | 1/2014 | Grigg | ............ | G06Q 20/20 |
| | | | | 705/17 |
| 2014/0006187 A1* | 1/2014 | Grigg | ............ | G06Q 20/20 |
| | | | | 705/17 |
| 2014/0006188 A1* | 1/2014 | Grigg | ............ | G06Q 20/20 |
| | | | | 705/17 |
| 2014/0027509 A1* | 1/2014 | Lieberman | ............ | G06Q 40/123 |
| | | | | 235/383 |
| 2014/0032896 A1* | 1/2014 | Chhabra | ............ | H04L 9/16 |
| | | | | 713/150 |
| 2014/0282928 A1* | 9/2014 | Morales | ............ | H04L 63/083 |
| | | | | 726/5 |
| 2015/0334079 A1* | 11/2015 | Laidlaw | ............ | H04L 51/38 |
| | | | | 340/539.11 |
| 2016/0044008 A1* | 2/2016 | Chhabra | ............ | H04L 9/16 |
| | | | | 713/153 |
| 2017/0186109 A1* | 6/2017 | Phillips et al. | ............ | G06Q 50/06 |

\* cited by examiner

CARGO MONITORING

CROSS REFERENCE TO RELATED APPLICATIONS

This application is a continuation in part and claims priority to, and benefit from, U.S. patent application Ser. No. 14/286,676, entitled "CONFIGURABLE, SECURE QUICK RESPONSE CODE CREATION AND USE", filed May 23, 2014, which claims priority to provisional patent application Ser. No. 61/829,005, entitled "CONFIGURABLE, SECURE QUICK RESPONSE CODE CREATION AND USE", filed May 30, 2013, and provisional patent application Ser. No. 61/829,013, entitled "DYNAMIC QUICK RESPONSE CODE CREATION AND USE", filed May 30, 2013, both of which are incorporated by reference for all purposes.

TECHNICAL BACKGROUND

Many different individuals and companies are involved in monitoring and maintenance of oil wells, sites, systems, equipment, devices, and distribution units. These entities include the oil companies, and many different servicing companies, which service many different aspects of the sites.

Companies may also choose to monitor the systems, devices, locations, and/or equipment, etc. This monitoring typically includes drivers or operators recording, in paper form, the condition of the equipment. Such recording could include the flow rate, tank level, oil level, the pressure, the gas level, or any other information about the equipment or site.

Barcodes and Quick Response Codes (QR Codes) are used to identify objects or provide other information about an object. A barcode is an optical machine-readable representation of data relating to an object. These codes are one-dimensional and are capable of being read by specially made scanners, phones, or any other device optically capable of scanning barcodes. In comparison, QR Codes are two-dimensional codes that are capable of storing a greater amount of data than Barcodes. QR Codes may be scanned using special scanners, phones, or other devices configured to read the encoded data.

OVERVIEW

Systems, software, and methods are provided for configurable, encrypted, secure QR code creation and use. Furthermore, these codes can be used by many entities to provide improved monitoring systems for a variety of systems.

DESCRIPTION

Systems, methods, and software are provided for improved monitoring systems. In at least one example, the system includes encrypted QR codes at a well site. These well sites may contain many devices. The devices may have an associated QR code. When a user arrives at the well site, the user may record information such as the identifier code of the various devices, as well as any other information about the devices using an electronic user device. Once the information is recorded, the data may then be transmitted to a central system that maintains information regarding all systems. Communications with the information may also be created and distributed.

In an example, the system includes tagged equipment that needs to be monitored. This equipment could include trucks, machinery, or any other equipment that requires maintenance checks. In operation, a user device may be used to record data about the maintenance of the equipment such as the fuel level, oil level, or any other useful maintenance information.

In another example, the QR code is created with information the particular user needs to record, or is authorized to record. The QR code may also be encrypted so that the information may not be inadvertently given to an unauthorized user. This may also reduce the likelihood the information may be stolen.

Once the data is recorded, the data may then be transmitted to a central system that maintains information regarding all the equipment. The communications can include dynamically configurable reports, which include the information. The report may be based at least in part on the user, and/or the recorded information. The report may include billing information well as other information.

Figure 1:
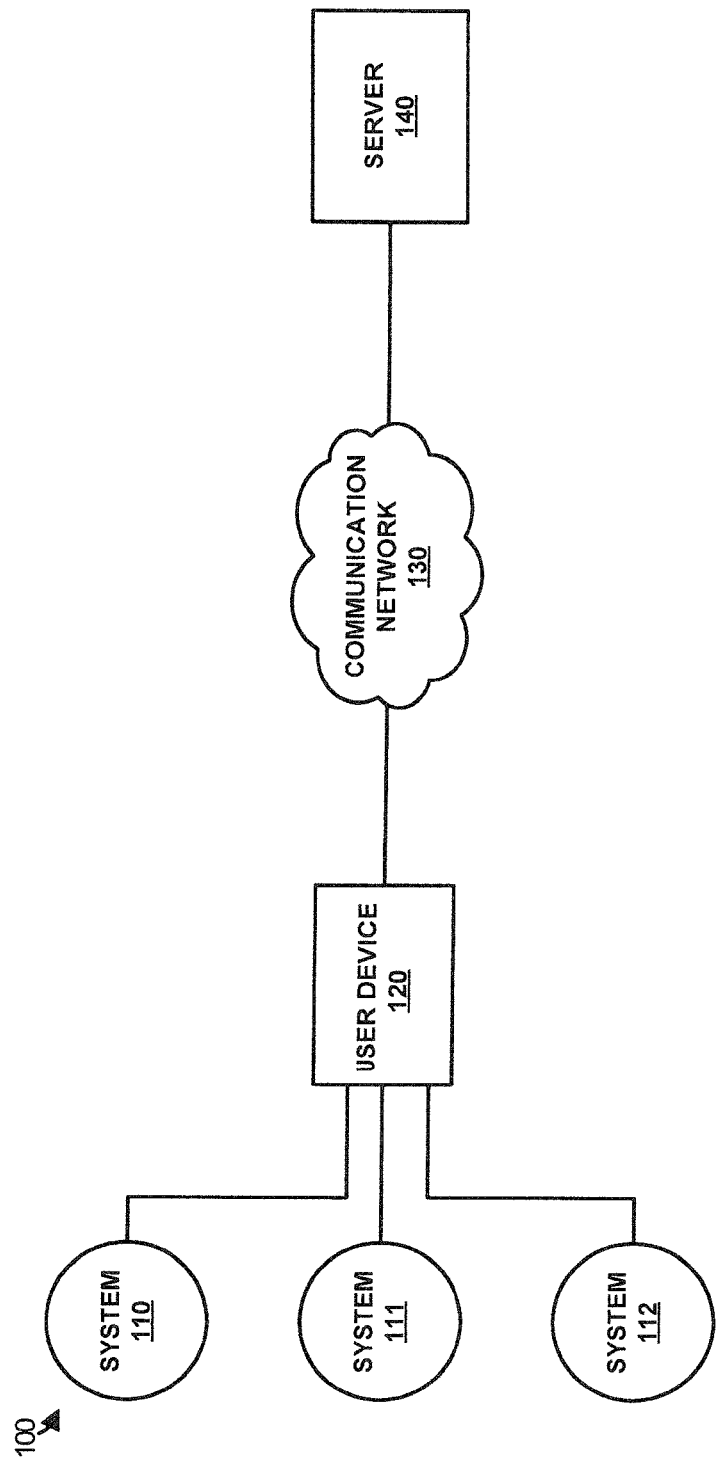
FIG. 1 illustrates a monitoring system according to one example.

FIG. 1 illustrates a monitoring environment 100 according to one example. System 100 includes systems 110-112, user device 120, communication network 130, and server 140. In FIG. 1, user device 120 records information about systems 110-112 then transmit this information to server 140 through communication network 130.

In an example, systems 110-112 can include a quick response code generation system associated with an asset. The asset may include any object that can have associated information. These devices can include assets, wells, sites, locations, tanks, valves, level sensors, etc. In another example, systems 110-112 can include trucks, cars, or any other mechanical equipment.

User device 120 can include any device(s) capable of collecting information about systems 110-112. Device 120 can include smart phones, tablets, computers, or any other portable device capable of collecting information. The information collected may include an identifier for the object such as an encrypted QR code, the amount of oil or other product being transferred, the oil level of the equipment, tank level, flow, temperature, as well as any other information about systems 110-112.

Systems 110-112 may receive user information from user device 120. The user information may include identifiers, authorization information, authorization levels, and other information. The authorization information may be used by systems 110-112 to identify or determine information that the user is authorized to receive.

Systems 110-112 may then encrypt the determined information and create a QR code to be captured by user device 120. The user may add user inputted information to the QR code, which may be sent to server 140. The user input information may include information about volume levels, service needed, service accomplished, amounts removed, as well as any other information about the system, or other information.

The QR codes may be adjacent objects, and may include information about the device or object. The user may then scan the QR codes instead of writing down information about the device or object. The QR codes may be configurable in that they may be set up with keys and values, or fields and values similar to a spreadsheet program or application. With this configuration, different fields and values may be set up for difference systems, devices, locations, and/or equipment, etc. This may be very beneficial for including information about different systems, devices, locations, and/or equipment, etc.

In an example, the user may be a service person for a well site. The user may have a cell phone with an application for reading or capturing QR codes. The QR codes for the site and device may have been previously affixed on or near the site and devices. The application may use the GPS of the phone to determine the well site information where the user is located. The user may then scan QR codes of the equipment the user is to work on. The user may also enter information via a user interface of the app, such as level information, flow information, etc. This may reduce the amount of information a user may need to enter, and may reduce the errors in recording and transcription of the data to various report, etc.

The QR codes may be encrypted such that non-authorized persons or users may not be able to get information when trying to read the QR code.

Communication network 130 can include the Internet, wired or wireless networks, cellular networks, satellite networks, or any other form of communication or network between user device 120 and server 140, and can include cloud-type programs and devices. Central database 140 can include one or more server computers, desktop computers, or any other devices configured to store and track information received from user device 120.

Server 140 may receive the captured QR code and decode and/or decrypt it. It will be appreciated that the user device may decode the QR code, and/or may decrypt the information before sending to the server.

Server 140 or associated processors may then populate fields of a dynamically configurable report with the decrypted information. The report may be configurable by the user via user device, or at the server 140, or by other devices and users. The report may be configurable based at least in part on the user, the task the user is attempting, and/or the information recorded, and/or any other information. The report may include billing information. The billing information may go to a supervisor for approval before being sent to the client.

Figure 2:
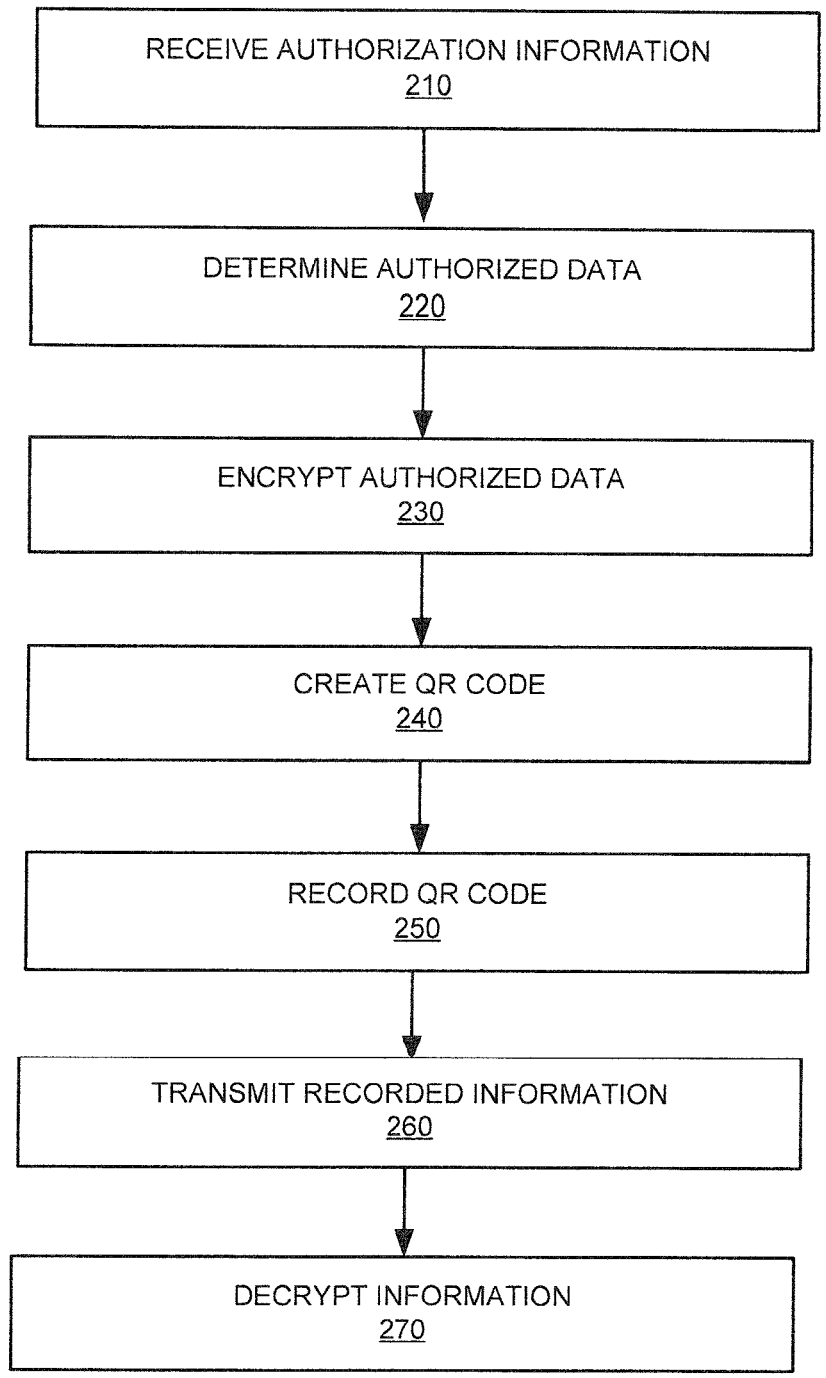
FIG. 2 illustrates a monitoring method according to one example.

FIG. 2 illustrates a monitoring method 200 for monitoring systems, devices, locations, and/or equipment, etc. The method begins with the user starting a recording application on a user device. A QR code system may then receive information from the user device, including an authorization information or level (step 210). This user device may include a smart phone, tablet computer, or any other wireless device configured to collect information from the systems, devices, locations, and/or equipment, etc., and to pass information to the system.

Authorized data may then be determined (220) based at least in part on the received authorization information. The determined data may only include data the user is authorized to collect or see. With this system, service company employees may only be authorized to see and collect the information relevant to their job. Similarly, oil company employee users may be able to see and collect other or more data.

In one example, other information may be recorded by the user such as the amount of oil transferred, pictures of the surrounding area, amount of time at the location, or any other information regarding the user's transaction at the system. Further, the user device could record times and global positioning locations for the transactions.

The authorized data may be encrypted (230). This encryption may be accomplished such that unauthorized users may not be able to see or use the data. The encrypted data may then be used to create a QR code (240).

A user may then record, decode, and/or capture the encrypted QR code (250). This may be accomplished using a user device, other device, or may be transmitted via a network to a server or central database.

Once the system or device information has been read and/or recorded, the collected information is transferred to a server to store and track the information from all of the systems (step 260).

In one example, the information gathered from the system could be transmitted after all the information is gathered. In another example, the information could be transmitted immediately as the information is gathered. In situations where the communication network is unavailable, the information can be sent when the network becomes available. In another example, the collected information could be sent periodically to the central database over the communication network. In another example, the collected information could be requested by the central database.

Additionally, the information from a system may be determined from an encrypted QR code, Barcode, written title, or any other method of identifying the system or device. In one example, the system can include a QR code such that the user may take a picture of the code to determine the information about the system or device or to pass on that recorded picture to a server.

The QR code can then be decoded and/or decrypted (270). Once the authorized information encoded in the QR code is determined, it may be used for various purposes. One use may be in a dynamically created report, or invoicing, among other uses.

Communications can then be created. The communications can include a dynamic job-specific report. The user may select fields to include in the report, and the QR codes and user entries may be used to populate the fields with data. This may replace a "trip" sheet, gauge sheet, or other report in which this information is written down and tuned in at a central office.

The communication may also include sending this information in a report to a supervisor. It may also include creating a billing report to be sent to the client. This may reduce errors in hand writing information, and may reduce time to billing by automatically accomplishing this. This may also increase the reliability of the data and the report, as the user's location and information about the system from the QR codes will be more accurate than the user filling out a paper form.

Although the example transaction method is an oil transaction method, it should be understood that the method could apply to any situation that uses QR codes to monitor transactions.

Additionally, it should be understood that the order of events in method 200 could be rearranged or accomplished concurrently by various different devices, etc.

Figure 3:
FIG. 3 illustrates an example QR Code.

FIG. 3 illustrates an example QR Code which includes encrypted information about a system or device. This type of QR code may be used to receive, record and read information about a system or device, such as sites, wells, tanks, valves, vehicles, or any other information about any other device for which this system is capable.

Figure 5:
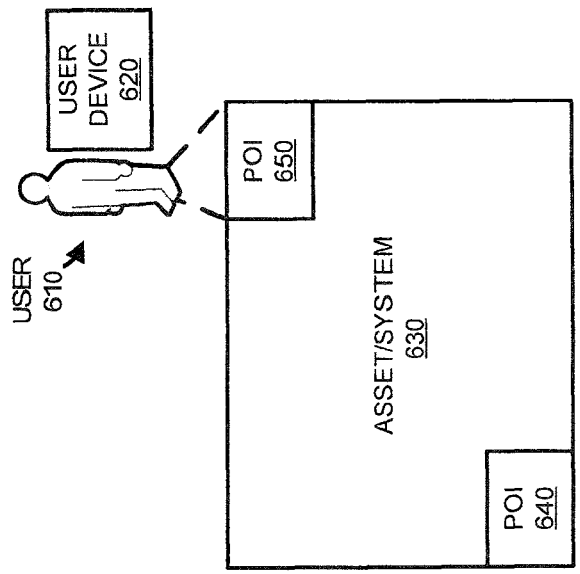
FIG. 5 illustrates an operation of a monitoring system according to one example.
Figure 4:
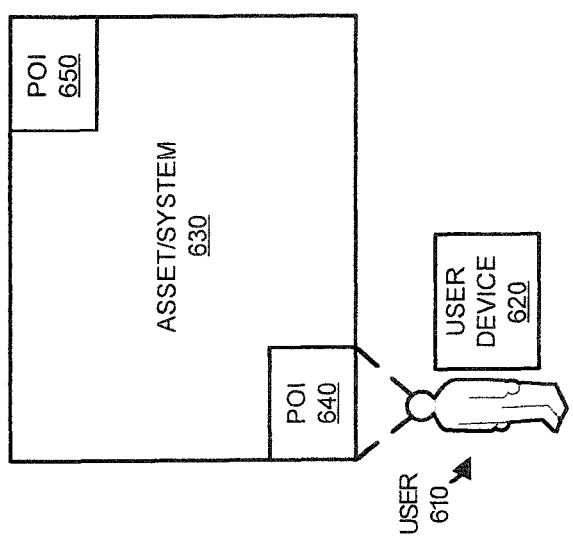
FIG. 4 illustrates an operation of a monitoring system according to one example.

FIGS. 4 and 5 illustrate an example operation of the monitoring system. In FIGS. 4 and 5, rather than recording information about a system and/or object, the user device may be configured to record the status of mechanical equipment including the oil or water level of the equipment, the tire pressure of the equipment, the flow, the position of a valve, information about the well or site, or any other information about the equipment. The equipment could include trucks, machinery, tanks, valves, wells, pumps, or any other equipment used to perform a task. FIGS. 4 and 5 include user 610, user device 620, equipment 630, and points of interest 640-650 (POI).

In operation, user 610 will initiate a recording application on user device 620. The application will provide user information to the asset/system 630 and/or related systems. The user information may include an authorization information, indicator, or level. The system may then provide encrypted information based at least in part on the received user information.

The recording application can allow user 610 to record or capture the encrypted information about equipment 630 including an identifier of equipment 630 and information about points of interest 640-650. Points of interest 640-650 can include a pump, tank, valve, level, flow, the tires, or any other point of interest on the equipment.

As can be seen in FIG. 4, user 610 records information about point of interest 640. This information may include a Barcode, a QR code, a name, a number, or any other information related to point of interest 640. Further, the application on user device 620 may allow user 610 to input information such as the tank level, flow rate, amount of flow for a period of time, the tire pressure, or any other information about point of interest 640. The application may also allow user 610 to take pictures of equipment 630 and point of interest 640, which may be recorded information about POI 640, 650.

Next, after recording information about point of interest 640, user 610 may then proceed to record information about point of interest 650 (FIG. 5). This information may include a Barcode, a QR code, a name, a number, or any other identifier of point of interest 650. Further, the application on user device 620 may allow user 610 to input information such as the oil level, the tire pressure, or any other information about point of interest 650. The application may also allow user 610 to take pictures of equipment 630 and point of interest 650. It should be understood that although FIGS. 4 and 5 include two points of interest, any number of points of interest could be recorded by the system.

In one example, user device 620 could gather other information such as the identity of the user device, the global positioning location of the user device, the amount of time to record the information about all of the points of interest, the amount movement by the user in recording the information about the points of interest, information regarding the POI 640, 650, pictures of the equipment, and/or service needed at the POI 640, 650 or any other information about equipment 630.

Once information is gathered by user device 620, user device 620 may then transfer the information to a central database or server using a communication network such as the Internet or a cellular network.

The server may then decrypt the information. The central database may then store all of the data about equipment 630, as well as any other data about equipment sent from similar user devices.

The server, central database, or other system may then create, populate, and transmit a dynamic and possibly job-specific report. The report may be based on the user information from the user device. This information may include the type of service to be accomplished by the user, amount of time the user is near the systems and devices, etc. The report may also be based on the type of information collected, such as if the user collects information about water tank levels, then the report may include data about the water system, and prompt the user for all information needed, such that the user may not omit needed information.

One report may include specifics of the particular transaction, such as tank levels and flow rates. This report may be sent to a supervisor for approval, then on to a client. Another report may be an invoice for the service, and may include some of the information collected, along with billing and payment information. This report may also be sent to a supervisor for approval, or may be automatically sent based on the supervisor's approval of the first report.

The user or other person may be able to dynamically create a report or report type. Different fields may be included or excluded in almost real-time. In this manner, a customized report may be accomplished and different reports and information may be included for different wells, clients, systems, devices, POIs, etc.

The QR codes may be encrypted such that only certain codes are readable by certain users, and/or only certain information is provided to certain users. Furthermore, the system may encrypt some data and allow other data to be viewed by the user.

In the example of the water system, the user at a system to service the water system may not be able to read the QR code about oil flow rate. This information may not be provided. The user device may be programmed to not be capable of reading, decoding, or decrypting certain QR codes.

Figure 6:
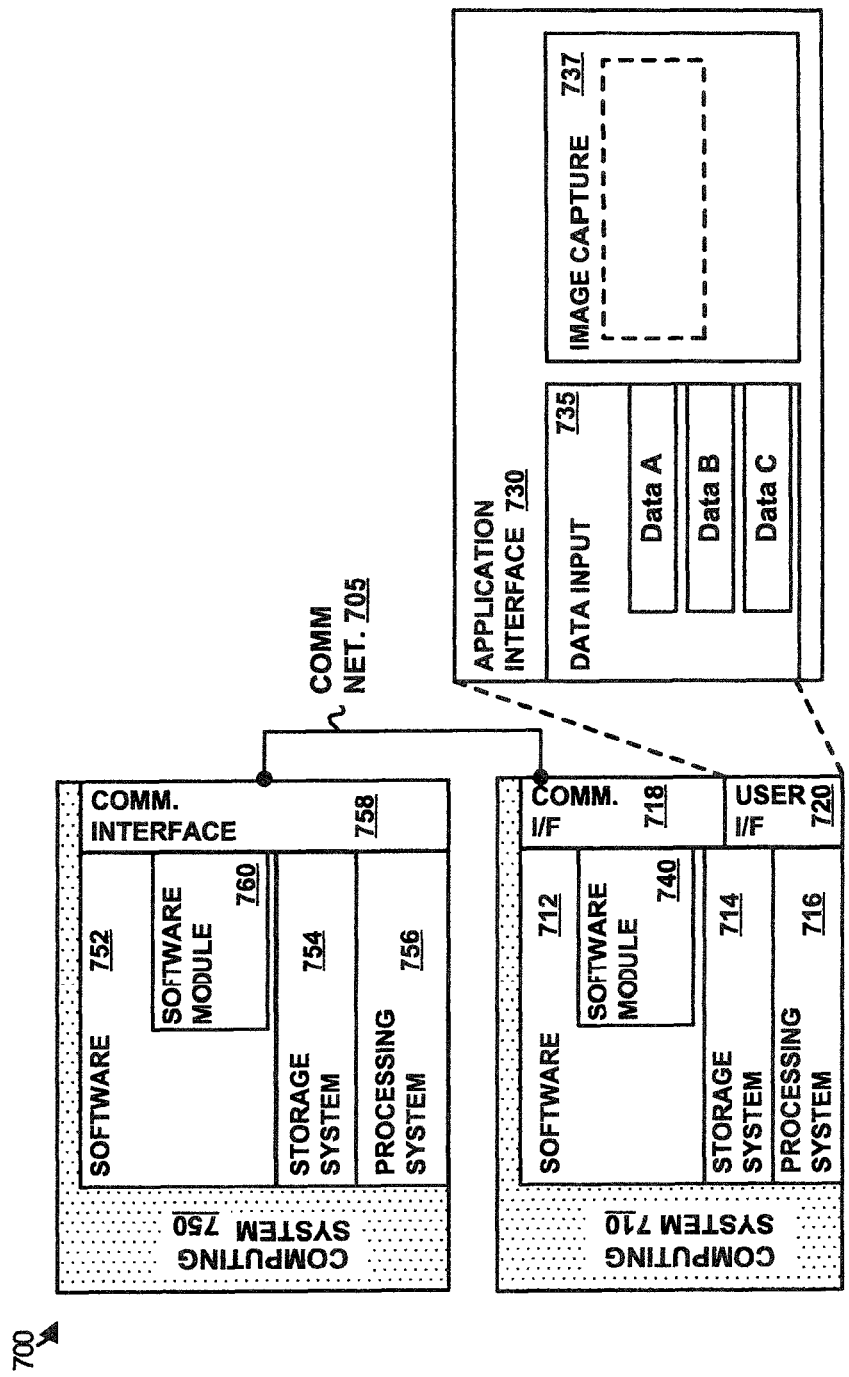
FIG. 6 illustrates a monitoring computing environment according to one example.

FIG. 6 illustrates a monitoring computing environment 700 according to one example. Computing environment 700 includes computing system 710 and computing system 750. Computing system 710, in the present example, corresponds to user device 120 and/or QR code creation system 110-112, and computing system 750 corresponds to server 140, and/or QR code creation system 110-112. Computing system 710 can include any smart phone, tablet computer, laptop computer, or other computing or mobile device capable of reading, and/or recording data about systems, devices, locations, and/or equipment, etc. Computing system 750 can include any server computer, desktop computer, laptop computer, or other device capable of storing and managing the data collected by computing system 710 or other similar computing systems. Either system 710, 750 can be capable of creating the encrypted QR code or accomplishing any of the steps or functions described in this description.

In FIG. 6, computing system 710 includes processing system 716, storage system 714, software 712, communication interface 718, and user interface 720. Processing system 716 loads and executes software 712 from storage system 714, including software module 740. When executed by computing system 710, software module 740 directs processing system 716 to receive data systems, devices, locations, and/or equipment, etc. Such data could include any of the information described above, including but not limited to the functionality described for FIGS. 1-2 and 4-5.

Although computing system 710 includes one software module in the present example, it should be understood that one or more modules could provide the same operation. Similarly, the computing systems may be distributed using other computing systems and software.

Additionally, computing system 710 includes communication interface 718 that can be further configured to transmit the collected data to computing system 750 using communication network 705. Communication network 705 could include the Internet, cellular network, satellite network, RF communication, blue-tooth type communication, near field, or any other form of communication network capable of facilitating communication between computing systems 710, 750. In some examples, communication interface 718 can further include a global positioning system to determine the location of computing system 710.

Referring still to FIG. 6, processing system 716 can comprise a microprocessor and other circuitry that retrieves and executes software 712 from storage system 714. Processing system 716 can be implemented within a single processing device but can also be distributed across multiple processing devices or sub-systems that cooperate in executing program instructions. Examples of processing system 716 include general purpose central processing units, application specific processors, and logic devices, as well as any other type of processing device, combinations of processing devices, or variations thereof.

Storage system 714 can comprise any storage media readable by processing system 716, and capable of storing software 712. Storage system 714 can include volatile and nonvolatile, removable and non-removable media implemented in any method or technology for storage of information, such as computer readable instructions, data structures, program modules, or other data. Storage system 714 can be implemented as a single storage device but may also be implemented across multiple storage devices or sub-systems. Storage system 714 can comprise additional elements, such as a controller, capable of communicating with processing system 716.

Examples of storage media include random access memory, read only memory, magnetic disks, optical disks, flash memory, virtual memory, and non-virtual memory, magnetic cassettes, magnetic tape, magnetic disk storage or other magnetic storage devices, or any other medium which can be used to store the desired information and that may be accessed by an instruction execution system, as well as any combination or variation thereof, or any other type of storage media. In some implementations, the storage media can be a non-transitory storage media. In some implementations, at least a portion of the storage media may be transitory. It should be understood that in no case is the storage media a propagated signal.

Although one software module is shown, the software may be distributed across many devices, storage media, etc.

User interface 720 can include a mouse, a keyboard, a camera, image capture, a Barcode scanner, a QR scanner, a voice input device, a touch input device for receiving a gesture from a user, a motion input device for detecting non-touch gestures and other motions by a user, and other comparable input devices and associated processing elements capable of receiving user input from a user. These input devices can be used for defining and receiving data about the systems, devices, locations, and/or equipment, etc. Output devices such as a graphical display, speakers, printer, haptic devices, and other types of output devices may also be included in user interface 720. The aforementioned user input and output devices are well known in the art and need not be discussed at length here.

In some examples, computing system 710 can include an accelerometer to track the movement of the user around the systems and POIs, timer and GPS.

Application interface 730 can include data input 735 and image capture 737. In one example, data input 735 can be used to collect information regarding a distribution item such as the identifier of the distribution item, the seal tag identifiers, the amount of oil being transferred, or any other information about the system. In another example, data input 735 can be used to collect information about mechanical equipment such as oil level, tire pressure, or any other information about the equipment.

Further, application interface 730 could include image capture 737 that could be used to capture, record, or otherwise receive inputs such as QR Codes and Barcodes to identify information about systems, devices, locations, and/or equipment, etc.

It should be understood that although computing system 710 is shown as one system, the system can comprise one or more systems to collect data.

Computing system 750 includes processing system 756, storage system 754, software 752, and communication interface 758. Processing system 756 loads and executes software 752 from storage system 754, including software module 760. When executed by computing system 750, software module 760 directs processing system 756 to store and manage the data from computing system 710 and other similar computing systems.

Although computing system 750 includes one software module in the present example, it should be understood that one or more modules could provide the same operation.

Additionally, computing system 750 includes communication interface 758 that can be configured to receive the data from computing system 710 using communication network 705.

Referring still to FIG. 6, processing system 756 can comprise a microprocessor and other circuitry that retrieves and executes software 752 from storage system 754. Processing system 756 can be implemented within a single processing device but can also be distributed across multiple processing devices or sub-systems that cooperate in executing program instructions. Examples of processing system 756 include general purpose central processing units, application specific processors, and logic devices, as well as any other type of processing device, combinations of processing devices, or variations thereof.

Storage system 754 can comprise any storage media readable by processing system 756, and capable of storing software 752 and data from computing system 710. Data from computing system 710 may be stored in a word, excel, or any other form of digital file. Storage system 754 can include volatile and nonvolatile, removable and non-removable media implemented in any method or technology for storage of information, such as computer readable instructions, data structures, program modules, or other data. Storage system 754 can be implemented as a single storage device but may also be implemented across multiple storage devices or sub-systems. Storage system 754 can comprise additional elements, such as a controller, capable of communicating with processing system 756.

Examples of storage media include random access memory, read only memory, magnetic disks, optical disks, flash memory, virtual memory, and non-virtual memory, magnetic cassettes, magnetic tape, magnetic disk storage or other magnetic storage devices, or any other medium which can be used to store the desired information and that may be accessed by an instruction execution system, as well as any combination or variation thereof, or any other type of storage media. In some implementations, the storage media can be a non-transitory storage media. In some implementations, at least a portion of the storage media may be transitory. It should be understood that in no case is the storage media a propagated signal.

In some examples, computing system 750 could include a user interface The user interface can include a mouse, a keyboard, a voice input device, a touch input device for receiving a gesture from a user, a motion input device for detecting non-touch gestures and other motions by a user, and other comparable input devices and associated processing elements capable of receiving user input from a user. Output devices such as a graphical display, speakers, printer, haptic devices, and other types of output devices may also be included in the user interface. The aforementioned user input and output devices are well known in the art and need not be discussed at length here.

It should be understood that although computing system 750 is shown as one system, the system can comprise one or more systems to store and manage received data.

Figure 7:
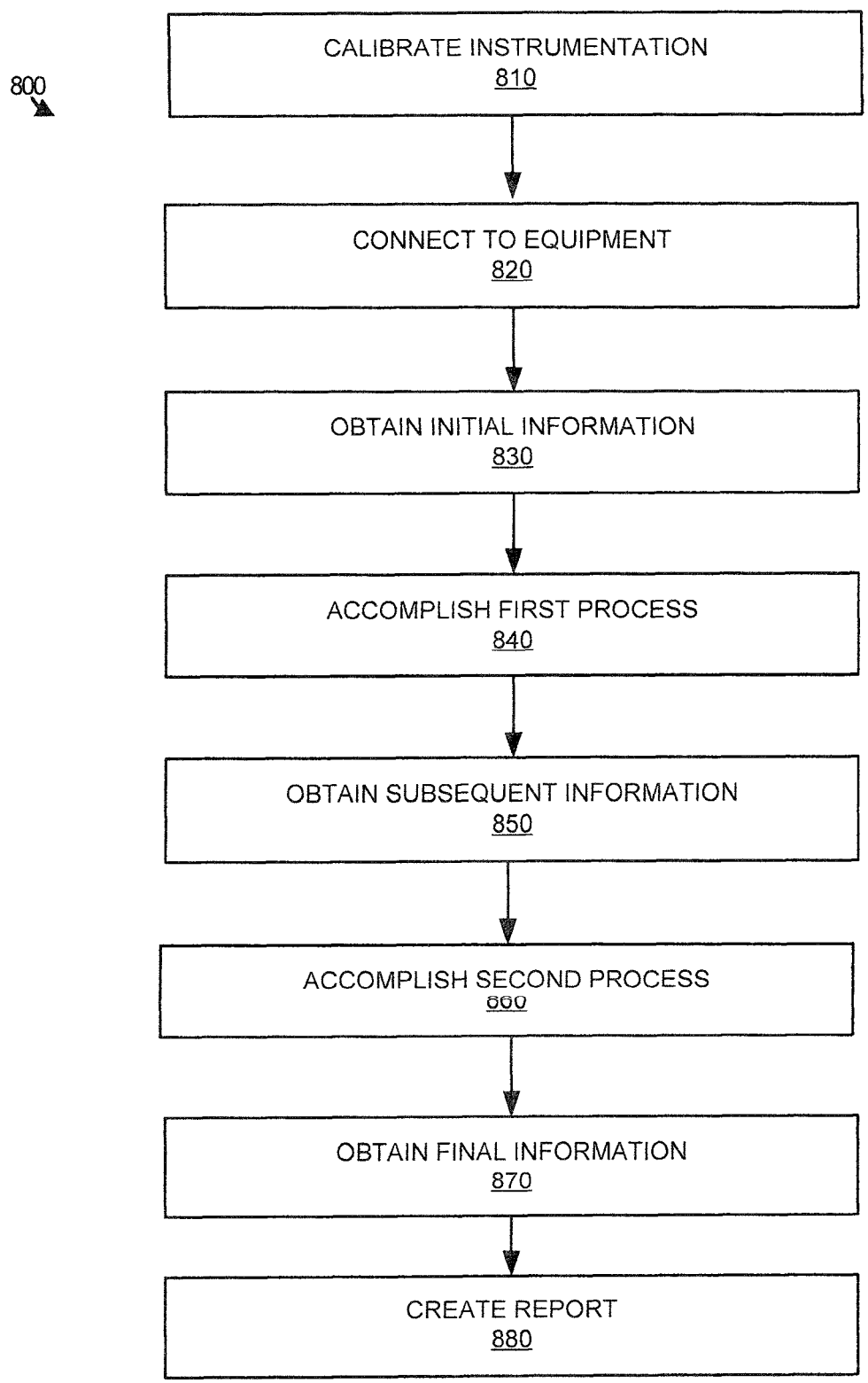
FIG. 7 illustrates a process method according to one example.

FIG. 7 illustrates a process method 800 utilizing instrumentation and QR codes, according to one example. Example method 800 may be used in various processes, but may particularly be used in water delivery and removal for oilfield processes.

Method 800 may include calibrating instrumentation 810. This may include calibrating a wireless level sensor for a particular vessel. This may be in barrels, volume, weight or other measurement, where the vessel is mounted on a truck.

Method 800 may also include connecting to equipment 820. A user device 120 may detect available wireless devices, instrumentation and equipment in the area and allow the user to select the one that is associated with the desired equipment. Alternatively, the user may scan a QR code associated with the equipment and the user device may use that information to connect to the appropriate wireless instrumentation somewhat automatically. GPS, time, date and other information also may be collected.

The user device 120 may then obtain initial information 830. The initial information may be the level of fluid in the vessel obtained from a wireless sensor of the selected equipment. This may also be the starting location or time, which may be used in a report and for billing, etc.

A first process may then be accomplished 840. The first process may include retrieving or adding water at a well site. The user may enter information about the well site, and/or scan a QR code at the well site to populate a report or trip ticket.

Once the first process is completed, the user may then obtain subsequent information 850. The subsequent information and the initial information may then be used to determine time, distance, volume etc. of the first process for a report or billing, etc.

Method 800 may also include accomplishing a second process 860. This may include taking on more water, or unloading, etc. The user may get a reading from the wireless sensor, as well as GPS, time, etc. before accomplishing the second process. This will insure that the location, volumes, etc. make sense. The subsequent information after the first process and the information before the second process should be similar in some aspects, such as volume in the vessel to insure no fraud or illegal dumping has taken place.

Once the second process is complete, the user device 120 may obtain final information 870 from the wireless sensor and other devices. The final information may include tank level, weight, GPS location, time, etc. This information, along with other information may be used for a report, trip ticket, or other use.

It will be appreciated that although two processes are shown, any number of processes may be encompassed by this disclosure.

In one example, oil and gas services suppliers may include hauling water to and from well sites. The water received from the well site may be subject to special disposal requirements. The special disposal requirements may include that the company is charged by the amount of water they dispose. If the services supplier has more than one pick up, it may be inaccurate to apportion the amounts of water picked up from each location and/or customer.

Therefore, a tanker truck may be fitted with a wireless level sensor. The level sensor may be calibrated to the tank and to transmit information in barrels. A driver may use a user device and connect with the sensor on the tanker truck he is driving that day. Furthermore, the truck may have a QR code associated with it that the driver can scan in. The QR code may include a vehicle identifier, calibration information, and other information. When the driver scans in the QR code, GPS and time may be included with the information gathering.

The driver may then drive to a well site. The driver may then scan a QR code at the well site, which could include information about the wellsite, including owner, type, etc. GPS and time may also be recorded at this time. The driver may then press a button to take an initial reading of the tank level from the wireless sensor via Bluetooth or other communication method. The driver may then carry out the first process of getting water from the wellsite. The driver may then take a subsequent reading of the level sensor to get the amount of water retrieved from the wellsite. This information, along with the wellsite information may be used to create a trip ticket, report or invoice for the well owner, insuring accurate information of the location, time and amount.

The driver may then go to a second wellsite, owned by a different owner than the first site. The driver may then take an initial reading for the second process of tank level, GPS, and time. This information can be used to determine if a driver let contaminated water out during the trip between well sites.

Then the second process can be carried out. A final reading of information may then be taken from the tank level sensor, along with time and GPS location. This information can be used for a report, trip ticket, invoice, etc.

The driver may then take the contaminated water to a disposal facility. The driver may again get an initial reading for this process from the level sensor, GPS and time. The process of unloading the water may be accomplished. Then a subsequent reading may be taken including the tank level, GPS, and time. This will insure accurate collection and disposal of wellsite water, as well as accurate and less time consuming invoicing of trip tickets for oil and gas services.

The included descriptions and figures depict specific implementations to teach those skilled in the art how to make and use the best mode. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method, comprising:
a handheld user device wirelessly receiving initial information regarding a level of a fluid substance within an asset of a vehicular system from a quick response (QR) code generated at least in part from a sensor operably connected to the asset;
the handheld user device receiving subsequent information about the level within the asset at least in part from a second QR code generated at least in part from the sensor after a first process has occurred at the asset, wherein the first process comprises adjusting the level within the asset; and
using at least a portion of the initial information and the subsequent information to create a dynamic report involving the first process,
wherein the initial information or the subsequent information comprises global positioning information.

2. The method of claim 1, further comprising the handheld user device obtaining second initial information about the asset after a second process has occurred at the asset.

3. The method of claim 2, further comprising the handheld user device obtaining second subsequent information about the asset after the second process.

4. The method of claim 1, further comprising the handheld user device calibrating the sensor.

5. The method of claim 1, wherein the asset comprises a liquid tank and the sensor comprises a tank level sensor.

6. The method of claim 1, wherein the dynamic report comprises at least one of customer, time, and location information.

7. The method of claim 1, further comprising transmitting the dynamic report to a cloud-based application.

8. A system for monitoring service, comprising:
a computing system including a handheld user device and a quick response (QR) code creation system;
a sensor operably connected to an asset, the sensor configured to wirelessly and communicationally couple to the computing system and transmit information about the asset to the computing system, the computing system configured to create a quick response (QR) code related to the information about the asset;
the handheld user device configured to obtain initial information regarding a level of a fluid substance with the asset from an initial QR code generated at least in part from the sensor, obtain subsequent information about the level within the asset from a subsequent QR code generated at least in part from the sensor after at least a first process has occurred at the asset, wherein the first process comprises adjusting the level within the asset, and use a portion of the initial information and the subsequent information to create a dynamic report involving the first process,
wherein the initial information or the subsequent information comprises global positioning information.

9. The system of claim 8, wherein the handheld user device is further configured to transmit the dynamic report to a server.

10. The system of claim 8, wherein the sensor comprises a tank level sensor.

11. The system of claim 8, wherein the dynamic report comprises a trip ticket or invoice.

12. The method of claim 1, wherein the asset comprises at least one of a truck, machinery, tank, valve, well, pump, and distribution unit.

13. The method of claim 1 further comprising using information inputted to the handheld user device to create the dynamic report.

* * * * *